United States Patent
Choi et al.

(10) Patent No.: US 7,133,342 B2
(45) Date of Patent: Nov. 7, 2006

(54) METHOD AND APPARATUS FOR DETERMINING A TYPE OF DISK

(75) Inventors: Byoung-ho Choi, Suwon (KR); Byung-in Ma, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1191 days.

(21) Appl. No.: 09/727,469

(22) Filed: Dec. 4, 2000

(65) Prior Publication Data

US 2001/0006211 A1 Jul. 5, 2001

(30) Foreign Application Priority Data

Dec. 2, 1999 (KR) ........................................ 1999-54475

(51) Int. Cl.
*G11B 3/90* (2006.01)

(52) U.S. Cl. .................................. 369/53.22; 369/53.37

(58) Field of Classification Search ................ 369/53.2, 369/53.22, 53.23, 53.31, 53.37, 53.41
See application file for complete search history.

(56) References Cited

U.S. PATENT DOCUMENTS 5,036,505 A 7/1991 Gleim ..................... 369/44.25
5,684,771 A 11/1997 Furukawa et al.

FOREIGN PATENT DOCUMENTS

| EP | 0 833 311 A2 | 4/1998 |
| EP | 0 881 638 A1 | 12/1998 |
| EP | 0 926 662 A2 | 6/1999 |

*Primary Examiner*—Paul W. Huber
(74) *Attorney, Agent, or Firm*—Staas & Halsey LLP

(57) ABSTRACT

An optical recording/reproducing apparatus and method to determine a type of disk including a photodetector divided into at least two light receiving sections in a radial direction. A radial subtractor generates a radial push-pull signal from a difference between light receiving signals from a disk and received by the at least two light receiving sections, where the disk includes one of a first disk and a second disk. An upper envelope detector detects an upper envelope signal from the radial push-pull signal and a lower envelope detector detects a lower envelope signal from the radial push-pull signal. A phase comparator detects a phase difference between the upper envelope signal and the lower envelope signal. A type of disk determiner distinguishes the first disk from the second disk according to a magnitude of the phase difference and outputting a signal indicative thereof, where the second disk includes a density higher than the first disk. A servo error generator and servo controller receives the magnitude of the phase difference and the light receiving signals and outputting servo error signals. A servo driver amplifier receives the servo error signals to output a voltage to drive a spindle motor of the disk. Furthermore, a first track cross signal generator generates a first track cross signal from an envelope of an RF SUM signal, wherein the RF SUM signal is obtained by adding the light receiving signals. A second track cross signal generator generates a second track cross signal from an envelope of the radial push-pull signal. A switch selectively outputs one of the first track cross signal and the second track cross signal according to the output signal from the type of disk determiner.

33 Claims, 4 Drawing Sheets

METHOD AND APPARATUS FOR DETERMINING A TYPE OF DISK

BACKGROUND OF THE INVENTION

1. Field of the Invention

The present invention relates to an optical recording/reproducing device, and more particularly, to a method and apparatus determining a type of disk loaded on the optical recording/reproducing device.

2. Description of the Related Art

It is necessary to distinguish a high-definition digital versatile disk (HD-DVD) from a digital versatile disk (DVD) in an optical recording/reproducing device that can be applied to a HD-DVD and a DVD.

Methods for reducing the wavelength of a light source, increasing the numerical aperture, NA, of an object lens, narrowing the track pitch of an optical disk, and reducing the length of a recording pit are used to provide for a high-definition digital versatile disk (HD-DVD). In particular, in the case of an optical disk of 12 cm, it becomes difficult to narrow the track pitch of the optical disk and to reduce the length of the recording pit because of limitations on manufacturing the light source and the object lens. Unlike in a conventional CD or DVD a crosstalk phenomenon occurs in the HD-DVD in which the information recorded on an adjacent track is mixed with the information of a currently read track because the size of the optical spot is larger than the track pitch. In contrast, the present invention provides for an apparatus and method that effectively determines the type of disk loaded on an optical recording/reproducing device thereby eliminating the crosstalk phenomenon.

SUMMARY OF THE INVENTION

Various objects and advantages of the invention will be set forth in part in the description that follows and, in part, will be obvious from the description, or may be learned by practice of the invention.

The present invention is achieved by providing a method and apparatus for distinguishing a digital versatile disk (DVD) from a high-definition digital versatile disk (HD-DVD) using a crosstalk phenomenon. Accordingly, it is an object of the present invention to provide an apparatus and method including a photodetector divided into at least two light receiving sections in a radial direction, including: a radial subtractor generating a radial push-pull signal from a difference between light receiving signals from a disk and received by the at least two light receiving sections, wherein the radial push-pull signal is an RF signal and the disk includes one of a first disk and a second disk; an upper envelope detector detecting an upper envelope signal from the radial push-pull signal; a lower envelope detector detecting a lower envelope signal from the radial push-pull signal; a phase comparator detecting a phase difference between the upper envelope signal and the lower envelope signal; and a type of disk determiner distinguishing the first disk from the second disk according to a magnitude of the phase difference and outputting a signal indicative thereof, wherein the second disk comprises a density higher than the first disk.

Furthermore, it is another object of the present invention to provide for an apparatus and method to generate a track cross signal in an optical disk recording/reproducing device for a high density disk and a low density disk including a photodetector divided into at least two light receiving sections in a radial direction, including: a first track cross signal generator generating a first track cross signal from an envelope of an RF SUM signal, wherein the RF SUM signal is obtained by adding light receiving signals from the at least two light receiving sections; a second track cross signal generator generating a second track cross signal from an envelope of a radial push-pull signal, wherein the radial push-pull signal is obtained from a difference between the light receiving signals from a disk and received by the at least two light receiving sections and wherein the disk comprises a first disk and a second disk; a type of disk determiner distinguishing the first disk from the second disk and outputting a signal indicative thereof, wherein the second disk comprises a density higher than the first disk; and a switch selectively outputting one of the first track cross signal and the second track cross signal according to the output signal from the distinguishing.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above and other objectives and advantages of the present invention will become more apparent by describing in detail preferred embodiments thereof with reference to the attached drawings in which.

DESCRIPTION OF THE PREFERRED EMBODIMENTS

Hereinafter, the structure and operation of the present invention will be described in detail with reference to the attached drawings.

In general, the apparatus and method implemented, in accordance with the present invention, to determine the type of disk is performed by generating a radial push-pull signal. The radial push-pull signal is the difference between light receiving signals generated by light receiving devices arranged in a radial direction in a photodetector. An upper envelope signal and a lower envelope signal of the radial push-pull signal are detected. A phase difference between the upper envelope signal of the radial push-pull signal and a lower envelope signal of the radial push-pull signal is subsequently detected. A high density disk (i.e., HD-DVD) is distinguished from a low density disk (i.e., DVD) according to the magnitude of the detected phase difference. In an exemplary embodiment, the low density disk is determined to be loaded when the detected phase difference is larger than a reference value and the high density disk is determined to be loaded when the detected phase difference is less than the reference value.

Figure 1A:
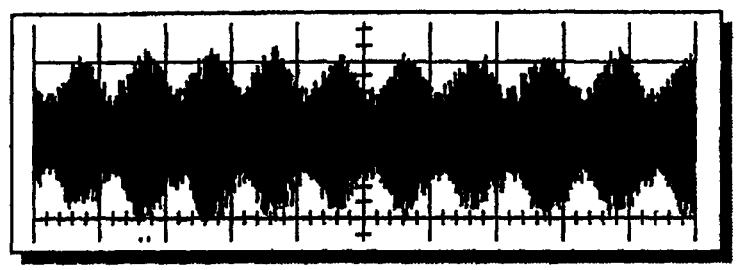
FIGS. 1A through 1E illustrate waveforms of a radial push-pull signal of a high-definition digital versatile disk (HD-DVD)
Figure 1B:
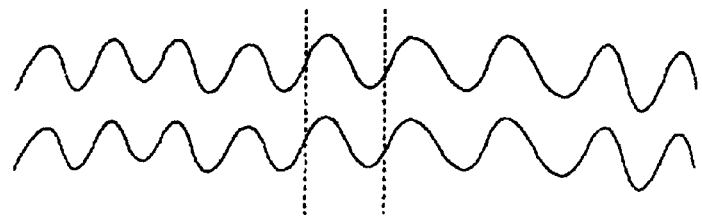
Figure 1C:
Figure 1D:
Figure 1E:
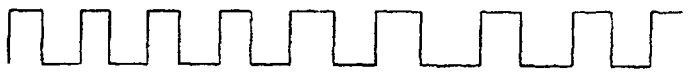

FIGS. 1A through 1E illustrate waveforms of a radial push-pull signal of a high-definition digital versatile disk (HD-DVD). FIG. 1A shows an optical signal waveform of a radial push-pull signal. FIG. 1B shows a waveform of an upper envelope signal of the radial push-pull signal shown in FIG. 1A. FIG. 1C shows a waveform of a lower envelope signal of the radial push-pull signal shown in FIG. 1A. FIGS. 1D and 1E show the waveforms obtained by shaping the waveforms of the signals shown in FIGS. 1B and 1C, respectively. As illustrated in FIGS. 1D and 1E, in the HD-DVD, the phase of the upper envelope signal of the radial push-pull signal is almost identical to the phase of the lower envelope signal of the radial push-pull signal.

Figure 2A:
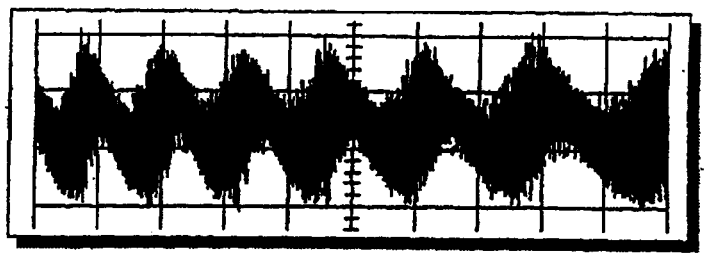
FIGS. 2A through 2E illustrate waveforms of a radial push-pull signal of a digital versatile disk (DVD)
Figure 2B:
Figure 2C:
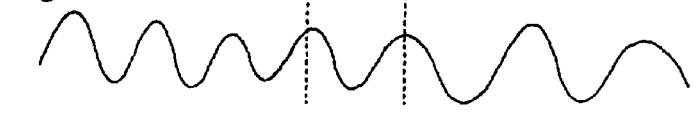
Figure 2D:
Figure 2E:

FIGS. 2A through 2E illustrate waveforms of a radial push-pull signal of a digital versatile disk (DVD). FIG. 2A shows a waveform of a radial push-pull signal. FIG. 2B shows a waveform of an upper envelope signal of the radial push-pull signal shown in FIG. 2A. FIG. 2C shows a waveform of a lower envelope signal of the radial push-pull signal shown in FIG. 2A. FIGS. 2D and 2E show the waveforms obtained by shaping the waveforms of the signals shown in FIGS. 2B and 2C, respectively.

As shown in FIGS. 2D and 2E, in the DVD, the phase of the upper envelope signal of the radial push-pull signal compared to the phase of the lower envelope signal of the radial push-pull signal is shifted by almost 90°. The reason for the phase shift between the upper envelope signal of the radial push-pull signal and the lower envelope signal of the radial push-pull signal in the DVD is because the crosstalk between adjacent tracks is larger in the HD-DVD than in the DVD. Thus, the DVD and the HD-DVD can be distinguished when loaded on the optical recording/reproducing device by comparing the phase of the upper envelope signal of the radial push-pull signal with the phase of the lower envelope signal of the radial push-pull signal.

Figure 3:
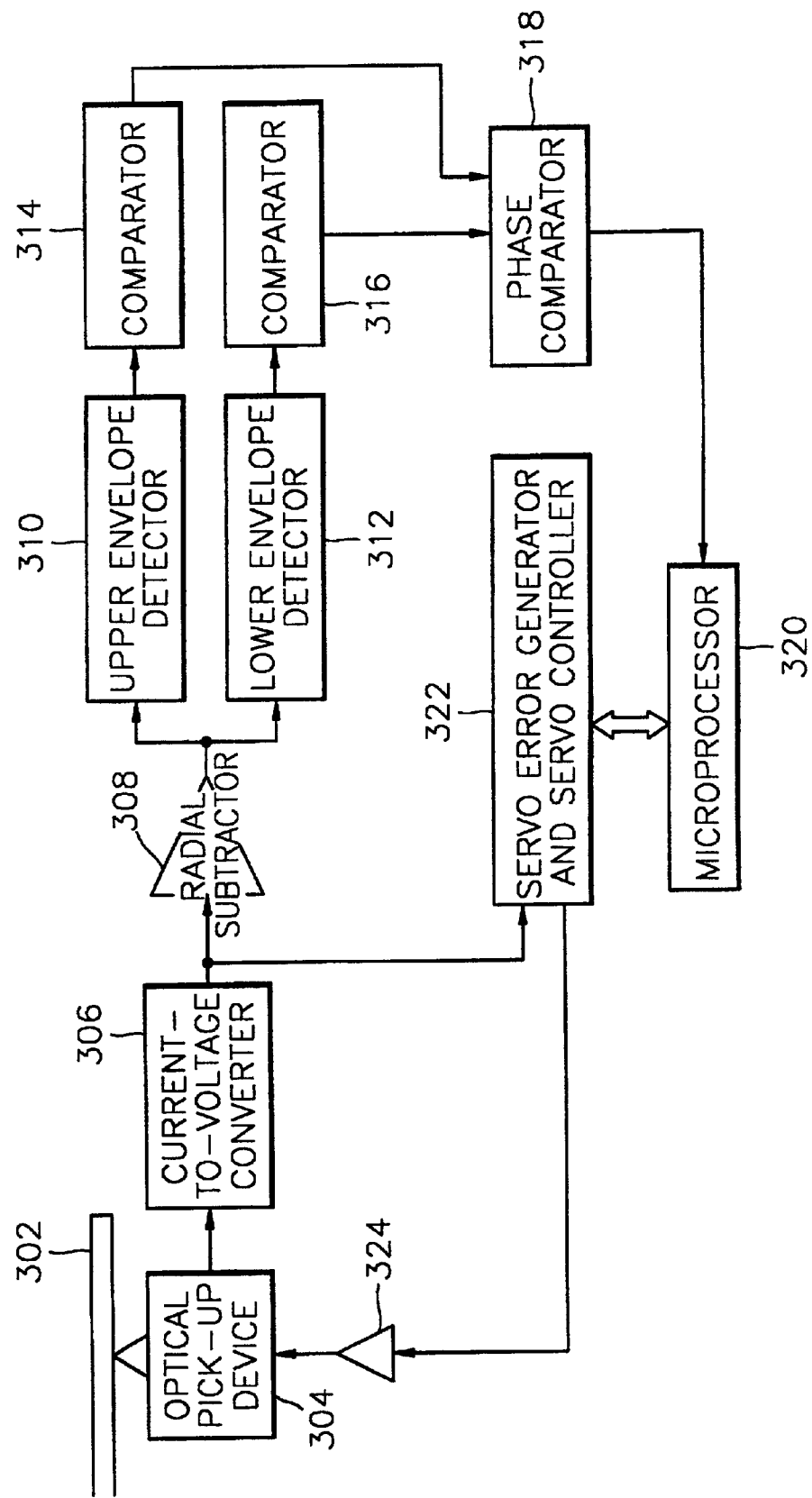
FIG. 3 is a block diagram illustrating the structure of an apparatus to determine the type of a disk, in accordance with the present invention.

FIG. 3 is a block diagram illustrating the structure of an apparatus to determine the type of a disk, in accordance with the present invention. The apparatus includes an optical disk 302 (i.e., a HD-DVD disk or DVD disk), an optical pick-up device 304, a current-to-voltage converter 306, a radial subtractor 308, an upper envelope detector 310, a lower envelope detector 312, comparators 314, 316 for shaping waveforms, a phase comparator 318, a microprocessor 320, a servo error signal generator and servo controller 322, and a servo driver amplifier 324.

A photodetector (not shown) inside the optical pick-up 304 picks up the data recorded on the optical disk by reflecting an optical signal on the optical disk 302 and generates an optical signal as a radio frequency signal corresponding to the intensity of the optical signal reflected on the optical disk 302. The photodetector may be divided into four light receiving sections or eight light receiving sections. In an exemplary embodiment, the photodetector is divided into two light receiving sections in a radial direction. The optical signal is converted from a current signal to a voltage signal using the current-to-voltage converter 306.

The radial subtractor 308 determines a difference between the light receiving signals generated by the light receiving sections arranged in the radial direction in the photodetector and generates the radial push-pull signal as shown in FIG. 1A or 2A. The radial direction refers to a direction that is perpendicular to the direction in which a pit stream is recorded on a track. The upper envelope detector 310 detects the upper envelope of the radial push-pull signal generated by the radial subtractor 308 and outputs the upper envelope signal as shown in FIG. 1B or 2B. In an exemplary embodiment, the upper envelope detector 310 may be a peak detector. The lower envelope detector 312 detects the lower envelope of the radial push-pull signal generated by the radial subtractor 308 and outputs the lower envelope signal shown in FIG. 1C or 2C. In an exemplary embodiment, the lower envelope detector 312 may be a bottom detector.

The comparator 314 compares the upper envelope signal provided by the upper envelope detector 310 with a predetermined threshold value and binarizes the upper envelope signal. In turn, the comparator 316 compares the lower envelope signal provided by the lower envelope detector 312 with the predetermined threshold value and binarizes the lower envelope signal.

The phase comparator 318 compares the phase of the binarized upper envelope signal provided by the comparator 314 with the phase of the binarized lower envelope signal provided by the comparator 316 and generates an electrical signal corresponding to the phase difference. The microprocessor 320 receives the electrical signal corresponding to the phase difference and determines the type of disk according to the magnitude of the phase difference. For example, if the microprocessor 320 determines that the magnitude of the phase difference is small, then the microprocessor 320 determines that the high density disk (i.e., the HD-DVD) is loaded. However, if the microprocessor 320 determines that the magnitude of the phase difference is about 90°, then the microprocessor 320 determines that the low density disk (i.e., the DVD) is loaded. A person of ordinary skill in the art will appreciate that the microprocessor 320 can be of any digital or analog type such as an application specific integrated circuit (ASIC), a microcomputer, a micro-controller, or a combination of suitable electronic components.

Furthermore, the servo error generator and servo controller 322 is implemented because the high density disk is distinguished from the low density disk using the light receiving signal generated by the photodetector. The servo error generator and servo controller 322 receives a control signal from the microprocessor 320 indicative that either a high density optical disk is loaded or a low density optical disk is loaded. The servo error generator and servo controller 322 further receives the voltage signal from the current-to-voltage converter 306. The servo error generator and servo controller 322 generates servo error signals including a focusing error signal, a tracking error signal, a carriage error signal, and a spindle error signal. These signals are then applied to the respective transducers (not shown) in the optical pick-up device 304 through the servo driver amplifier 324. For instance, the servo error signals output a voltage to drive a spindle motor (not shown) of the optical disk 302. Thus, the spindle motor is driven, through the servo driver amplifier 324, with an initial voltage or at an initial speed to support the most recent optical disk 302 detected. For example, in the case of the optical pick-up device 304 that can support both a CD 32× speed and a DVD-RAM 1× speed, the initial speed of the optical pick-up device 304 is set to support the DVD-RAM 1× rather than the CD 32×, to support the most recent optical disk 302.

Figure 4:
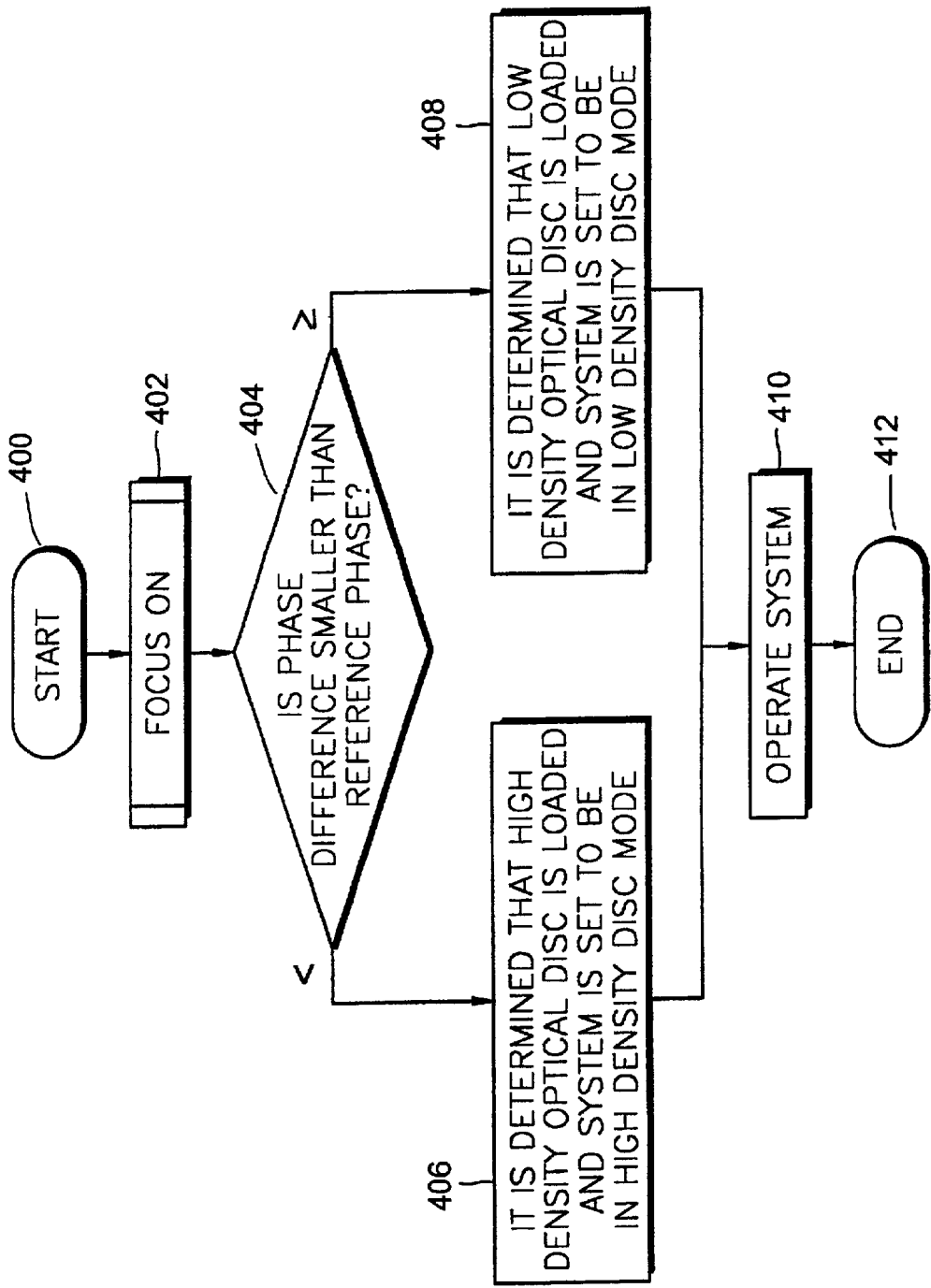
FIG. 4 is a flowchart illustrating a process to determine the type of disk, in accordance with the present invention.

FIG. 4 is a flowchart illustrating a process performed by the microprocessor 320 to determine the type of disk. The microprocessor 320 starts at operation 400 by clearing memories, setting initial flag conditions, etc., as is well known in the art. The microprocessor 320 then proceeds to operation 402 where a conventional focusing operation is performed where the optical pick-up device 304 transfers a pick-up (not shown) on a focus-on point on the optical disk 302. At operation 404, the microprocessor 320 determines whether the phase difference between the upper envelope signal and the lower envelope signal provided by the phase comparator 318 is less than a predetermined reference phase. If the microprocessor 320 determines that the phase difference is less than the predetermined reference phase, then the microprocessor 320 determines that the high density disk is loaded and proceeds to operation 406. At operation 406, the microprocessor 320 determines that a high density optical disk (i.e., HD-DVD) is loaded, in which the optical recording/reproducing device is set to be in a high density disk mode.

In contrast, at operation 404, if the microprocessor 320 determines that the phase difference is greater than or equal to the predetermined reference phase, then the microprocessor 320 determines that the low density disk is loaded and proceeds to operation 408. At operation 408, the microprocessor 320 determines that a low density optical disk (i.e., DVD) is loaded, in which the optical recording/reproducing device is set to be in a low density disk mode. At operation 410, the microprocessor 320 operates the optical recording/reproducing device in the disk mode set at either operation 406 or 408. At operation 412, the operation of the microprocessor 320 ends.

Figure 5:
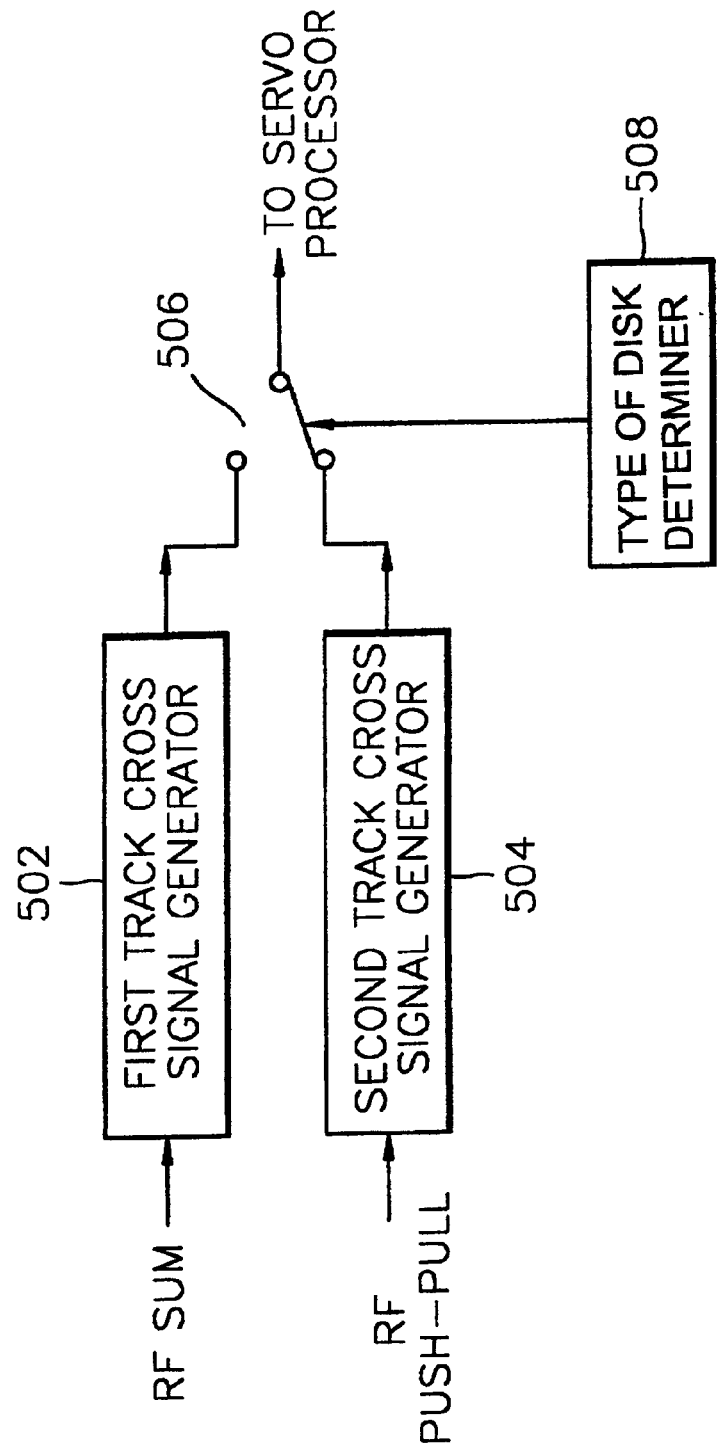
FIG. 5 is a block diagram illustrating the structure of an apparatus to select a track cross signal, in accordance with the present invention.

FIG. 5 is a block diagram illustrating the structure of an apparatus to select a track cross signal, in accordance with the present invention. The apparatus shown in FIG. 5 includes a first track cross signal generator 502, which is suitable for the low density disk, a second track cross signal generator 504, which is suitable for the high density disk, and a type of disk determiner 508. The first track cross signal generator 502 and the second track cross signal generator 504 of FIG. 5 are disclosed in detail in the U.S. Pat. Application Ser. No. 99-39832, which is entitled "Method for Detecting a Track Cross Signal of an Optical Disk Recording/reproducing Device and Apparatus therefor" and was filed by the applicant of the present invention.

As previously mentioned, in an exemplary embodiment, the photodetector is divided into two sections in the radial direction. An arithmetic unit (not shown) carries out a logical sum of the light receiving signals obtained from each section and provides an RF SUM. The RF SUM signal is then provided to a first track cross signal generator 502. The first track cross signal generator 502 generates the track cross signal by binarizing the envelope of the RF SUM signal. The second track cross signal generator 504 generates the track cross signal from the radial push-pull signal of the photodetector by binarizing the envelope of the radial push-pull signal.

In the low density disk, an envelope of the RF SUM signal may be easily obtained. In the high density disk, an envelope of the radial push-pull signal may be easily obtained. Therefore, it is necessary to generate the track cross signal by different methods depending on whether the disk is a low density disk or a high density disk. The type of disk determiner 508 (i.e., microprocessor 320) distinguishes the low density disk from the high density disk by the phase difference between the upper envelope signal of the radial push-pull signal and the lower envelope signal of the radial push-pull signal, using the method illustrated in FIG. 4. Depending on the phase difference, the type of disk determiner 508 enables a switch 506.

Specifically, if the type of disk determiner 508 determines that the disk loaded on the optical recording/reproducing device is the low density disk, then the type of disk determiner 508 triggers the switch 506 to select the output from the first track cross signal generator 502. In contrast, if the type of disk determiner 508 determines that the disk loaded on the optical recording/reproducing device is the high density disk, then the type of disk determiner 508 triggers the switch 506 to select the output from the second track cross signal generator 504. The output from either the first track cross signal generator 502 or the second track cross signal generator 504 is then provided to a servo processor.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A method for determining a type of disc in an optical disc recording/reproducing device comprising a photodetector divided into at least two light receiving sections in a radial direction, comprising:

generating a radial push-pull signal from a difference between light receiving signals from a disk and received by the at least two light receiving sections, wherein the disk comprises one of a first disk and a second disk;

detecting an upper envelope signal and a lower envelope signal from the radial push-pull signal;

detecting a phase difference between the upper envelope signal and the lower envelope signal; and distinguishing the first disk from the second disk according to a magnitude of the phase difference, wherein the second disk comprises a density higher than the first disk.

2. The method as recited in claim 1, wherein the distinguishing determines the first disk if the phase difference is greater than or equal to a reference phase difference.

3. The method as recited in claim 1, wherein the distinguishing determines the second disk if the phase difference is less than a reference phase difference.

4. The method as recited in claim 1, further comprising receiving the magnitude of the phase difference and the light receiving signals and outputting servo error signals;

using the servo error signals to output a voltage to drive a spindle motor of the disk.

5. The method as recited in claim 1, further comprising generating a first track cross signal from an envelope of an RF SUM signal, wherein the RF SUM signal is obtained by adding the light receiving signals;

generating a second track cross signal from an envelope of the radial push-pull signal; and selectively outputting one of the first track cross signal and the second track cross signal according to the distinguishing of the first disk from the second disk.

6. The method as recited in claim 1, further comprising comparing the upper envelope signal with a predetermined threshold prior to detecting the phase difference; and binarizing the upper envelope signal prior to detecting the phase difference.

7. The method as recited in claim 1, further comprising comparing the lower envelope signal with a predetermined threshold prior to detecting the phase difference; and binarizing the lower envelope signal prior to detecting the phase difference.

8. A method, comprising:

detecting a phase difference between an upper envelope signal and a lower envelope signal from a radial push-pull signal, wherein the radial push-pull signal is a difference between at least two light receiving signals from a disk and received by at least two light receiving sections in a photodetector, wherein the disk comprises one of a first disk and a second disk; and distinguishing the first disk from the second disk according to a magnitude of the phase difference, wherein the second disk comprises a density higher than the first disk.

9. The method as recited in claim 8, wherein the distinguishing determines the first disk if the phase difference is greater than or equal to a reference phase difference.

10. The method as recited in claim 8, wherein the distinguishing determines the second disk if the phase difference is less than a reference phase difference.

11. The method as recited in claim 8, further comprising generating a first track cross signal from an envelope of an RF SUM signal, wherein the RF SUM signal is obtained by adding the light receiving signals;

generating a second track cross signal from an envelope of the radial push-pull signal; and selectively outputting one of the first track cross signal and the second track cross signal according to the distinguishing of the first disk from the second disk.

12. A method, comprising:

obtaining a magnitude of a phase difference between an upper envelope signal of a radial push-pull signal and a lower envelope signal of the radial push-pull signal and determining a type of disk therefrom.

13. The method as recited in claim 12, further comprising dividing a photodetector into at least two light receiving sections in a radial direction; and generating the radial push-pull signal from a difference between light receiving signals from a disk and received by the at least two light receiving sections, wherein the disk comprises one of a first disk and a second disk.

14. The method as recited in claim 13, further comprising receiving the magnitude of the phase difference and the light receiving signals and outputting servo error signals;

using the servo error signals to output a voltage to drive a spindle motor of the disk.

15. The method as recited in claim 14, further comprising generating a first track cross signal from an envelope of an RF SUM signal, wherein the RF SUM signal is obtained by adding the light receiving signals;

generating a second track cross signal from an envelope of the radial push-pull signal; and selectively outputting one of the first track cross signal and the second track cross signal according to the distinguishing of the first disk from the second disk.

16. An apparatus determining a type of disc in an optical disc recording/reproducing device comprising a photodetector divided into at least two light receiving sections in a radial direction, comprising:

a radial subtractor generating a radial push-pull signal from a difference between light receiving signals from a disk and received by the at least two light receiving sections, wherein the disk comprises one of a first disk and a second disk;

an upper envelope detector detecting an upper envelope signal from the radial push-pull signal;

a lower envelope detector detecting a lower envelope signal from the radial push-pull signal;

a phase comparator detecting a phase difference between the upper envelope signal and the lower envelope signal; and a type of disk determiner distinguishing the first disk from the second disk according to a magnitude of the phase difference and outputting a signal indicative thereof, wherein the second disk comprises a density higher than the first disk.

17. The apparatus as recited in claim 16, wherein the radial push-pull signal is an RF signal.

18. The apparatus as recited in claim 16, wherein the type of disk determiner determines the first disk if the phase difference is greater than or equal to a reference phase difference.

19. The apparatus as recited in claim 16, wherein the type of disk determiner determines the second disk if the phase difference is less than a reference phase difference.

20. The apparatus as recited in claim 16, further comprising a servo error generator and servo controller receiving the magnitude of the phase difference and the light receiving signals and outputting servo error signals;

a servo driver amplifier receiving the servo error signals to output a voltage to drive a spindle motor of the disk.

21. The apparatus as recited in claim 16, further comprising a first comparator comparing the upper envelope signal with a predetermined threshold and binarizing the upper envelope signal prior to detecting the phase difference.

22. The apparatus as recited in claim 16, further comprising a second comparator comparing the lower envelope signal with a predetermined threshold and binarizing the lower envelope signal prior to detecting the phase difference.

23. The apparatus as recited in claim 16, further comprising a first track cross signal generator generating a first track cross signal from an envelope of an RF SUM signal, wherein the RF SUM signal is obtained by adding the light receiving signals;

a second track cross signal generator generating a second track cross signal from an envelope of the radial push-pull signal; and a switch selectively outputting one of the first track cross signal and the second track cross signal according to the output signal from the type of disk determiner.

24. An apparatus, comprising:

a phase comparator detecting a phase difference between an upper envelope signal and a lower envelope signal from a radial push-pull signal, wherein the radial push-pull signal is a difference between at least two light receiving signals from a disk and received by at least two light receiving sections in a photodetector, wherein the disk comprises one of a first disk and a second disk; and a type of disk determiner distinguishing the first disk from the second disk according to a magnitude of the phase difference and outputting a signal indicative thereof, wherein the second disk comprises a density higher than the first disk.

25. The apparatus as recited in claim 24, wherein the type of disk determiner determines the first disk if the phase difference is greater than or equal to a reference phase difference.

26. The apparatus as recited in claim 24, wherein the type of disk determiner determines the second disk if the phase difference is less than a reference phase difference.

27. The apparatus as recited in claim 24, further comprising a first track cross signal generator generating a first track cross signal from an envelope of an RF SUM signal, wherein the RF SUM signal is obtained by adding the light receiving signals;

a second track cross signal generator generating a second track cross signal from an envelope of the radial push-pull signal; and a switch selectively outputting one of the first track cross signal and the second track cross signal according to the output signal from the type of disk determiner.

28. An apparatus, comprising:

a type of disk determiner obtaining a magnitude of a phase difference between an upper envelope signal of a radial push-pull signal and a lower envelope signal of the radial push-pull signal and determining therefrom the type of disk and outputting a signal indicative thereof.

29. The apparatus as recited in claim 28, further comprising a photodetector divided into at least two light receiving sections in a radial direction; and a radial push-pull signal generator generating the radial push-pull signal from a difference between light receiving signals generated by the at least two light receiving sections.

30. The apparatus as recited in claim 29, further comprising an upper envelope detector detecting the upper envelope signal from the radial push-pull signal; and a lower envelope detector detecting the lower envelope signal from the radial push-pull signal.

31. The apparatus as recited in claim 30, further comprising a servo error generator and servo controller receiving the magnitude of the phase difference and the light receiving signals and outputting servo error signals;

a servo driver amplifier receiving the servo error signals to output a voltage to drive a spindle motor of the disk.

32. The apparatus as recited in claim 31, further comprising a first track cross signal generator generating a first track cross signal from an envelope of an RF SUM signal, wherein the RF SUM signal is obtained by adding the light receiving signals;

a second track cross signal generator generating a second track cross signal from an envelope of the radial push-pull signal; and a switch selectively outputting one of the first track cross signal and the second track cross signal according to the output signal from the type of disk determiner.

33. The apparatus as recited in claim 28, wherein the type of disk is one of a first disk and a second disk, wherein the second disk comprises a higher density than the first disk.

* * * * *